United States Patent [19]
Diem et al.

[11] Patent Number: 5,602,780
[45] Date of Patent: Feb. 11, 1997

[54] SERIAL TO PARALLEL AND PARALLEL TO SERIAL ARCHITECTURE FOR A RAM BASED FIFO MEMORY

[75] Inventors: Benjamin C. Diem, Sherman; M. Dwayne Ward, Garland, both of Tex.

[73] Assignee: Texas Instruments Incorporated, Dallas, Tex.

[21] Appl. No.: 139,348

[22] Filed: Oct. 20, 1993

[51] Int. Cl.$^6$ .................................. G11C 13/00
[52] U.S. Cl. ........................... 365/189.01; 365/189.02; 365/189.07; 365/221; 365/230.05
[58] Field of Search .................. 365/189.01, 189.02, 365/189.07, 221, 230.05, 78, 238.5

[56] References Cited

U.S. PATENT DOCUMENTS

| | | | |
|---|---|---|---|
| 4,616,338 | 10/1986 | Helen et al. | 365/189.05 |
| 5,197,035 | 3/1993 | Ito | 365/189.07 |
| 5,220,529 | 6/1993 | Kohiyama | 365/78 |

Primary Examiner—Viet Q. Nguyen
Assistant Examiner—F. Niranjan
Attorney, Agent, or Firm—Robby T. Holland; Wade James Brady, II; Richard L. Donaldson

[57] ABSTRACT

A FIFO memory (4) provides serial to parallel and parallel to serial data conversion. A read frame buffer (40) and a write frame buffer (30) are coupled with a RAM array (22). Serial input data is stored temporarily into the write frame (30) of fixed width, n bits wide. Then, the entire n bit wide frame of stored serial input data is written into RAM array (22) at once in parallel. Data read in parallel from RAM array (22) is stored temporarily into the read frame (40) and thereafter provided serially to the FIFO output (53). By converting serial input to parallel input, overall chip size is reduced by reducing the number of pointers required because it is not necessary to address the RAM (22) individually when serially writing data into it. The read frame (40) coupled to the write frame (30) and to the serial input data. This allows data written into the FIFO to be immediately available and allows the read frame (40) to receive backfilled data from the write frame (30).

8 Claims, 15 Drawing Sheets

FROM Fig. 5a

SERIAL TO PARALLEL AND PARALLEL TO SERIAL ARCHITECTURE FOR A RAM BASED FIFO MEMORY

FIELD OF THE INVENTION

This invention is in the field on integrated circuits related to memory devices and in more particular relates to first-in, first-out (FIFO) memories.

BACKGROUND OF THE INVENTION

First-in, First-out (FIFO) memories are commonly used to transfer data between computer processors that operate relatively fast and peripheral equipment that operate relatively slow. Examples of such FIFO memories, and related control circuitry, are contained in the following United States Patents of inventor Ward, herein, and Kenneth L. Williams assigned to Texas Instruments Incorporated: U.S. Pat. No. 5,097,442 "Programmable Depth First-In, First-out Memory" issued Mar. 17, 1992; U.S. Pat. No. 5,084,841 "Programmable Status Flag Generator FIFO Using Gray Code" issued Jan. 28, 1992; U.S. Pat. No. 4,864,543 "First-in, First-Out Memory With Counter Address Pointers For Generating Multiple Memory Status Flags" issued Sep. 5, 1989; U.S. Pat. No. 4,829,475 "Method and Apparatus For Simultaneous Address Increment and Memory Write Operations" issued May. 9, 1989; and, U.S. Pat. No. 4,839,866 "Cascadable First-In, First-Out Memory" issued Jun. 13, 1989. Other examples of FIFO memories and related circuitry are also contained in the following United States patents assigned to Texas Instruments Incorporated: U.S. Pat. No. 5,117,395 "Expansible FIFO Memory For Accommodating Added Memory Stages in A Multistage Memory With Common Control Signals" of Hashimoto issued May 26, 1992; U.S. Pat. No. 4,933,901 "Method For Assigning Priority to Read and Write Requests Received Closely In Time" of Tai and Chiu issued Jun. 12, 1990; U.S. Pat. No. 4,815,039 "Fast Real-Time Arbiter" of Tai and Chiu issued Mar. 21, 1989; and, U.S. Pat. No. 4,882,710 "FIFO Memory Including Dynamic Memory Elements" of Hashimoto et al. issued Nov. 21, 1989. U.S. Pat. No. 4,868,784 "Microcomputer With A Multi-Channel Serial Port having a Single Port Address" of Marshall et al. issued Aug. 19, 1989 additionally assigned to Texas Instruments Incorporated incorporates a FIFO memory into the serial port of a microcomputer in aiding data transmission.

While the above patents provide important contributions to FIFO memories, further improvements are desirable. For example, it would be beneficial if the operating frequency of the FIFO could be increased. This would advantageously allow faster data output from the FIFO memory. It would be desirable to avoid having to address every single bit when performing a WRITE/READ operation. This would advantageously reduce the number of address pointers on the FIFO and thus save chip area.

The above advantages are provided by the invention herein. Other advantages will be apparent to those of ordinary skill in the art having reference to the following specification and drawings.

SUMMARY OF THE INVENTION

A FIFO memory is organized to provide serial to parallel and parallel to serial data conversion by including a read frame buffer and a write frame buffer with the memory array. Serial input data is stored temporarily into a write frame of fixed width, n bits wide. Then, the entire n bit wide frame of stored serial input data is written into RAM at once in parallel. Data read in parallel from the RAM is stored temporarily into a read frame and thereafter provided serially to the FIFO output. This architecture advantageously allows for faster frequency of operation as the RAM is accessed only once every n clock cycles and advantageously allows for accessing the RAM in parallel while serially writing and reading to the FIFO's inputs and outputs respectively. The inventive architecture reduces overall chip area by reducing the number of pointers. By converting serial input to parallel input, it is not necessary to address the RAM individually when serially writing data into it. The architecture makes it possible to obtain a one bit wide FIFO where a word is only one bit wide. Since the read frame buffer is coupled to the serial data input, data written into the FIFO, on occasion, is immediately available for output. The read frame buffer thus functions as a cache and bypasses the memory. Additionally, since the read frame buffer is coupled to the write frame buffer, an improved READ/WRITE flow controller enables the read frame to receive backfilled data from the write frame.

DETAILED DESCRIPTION OF THE PREFERRED EMBODIMENT

Figure 1:
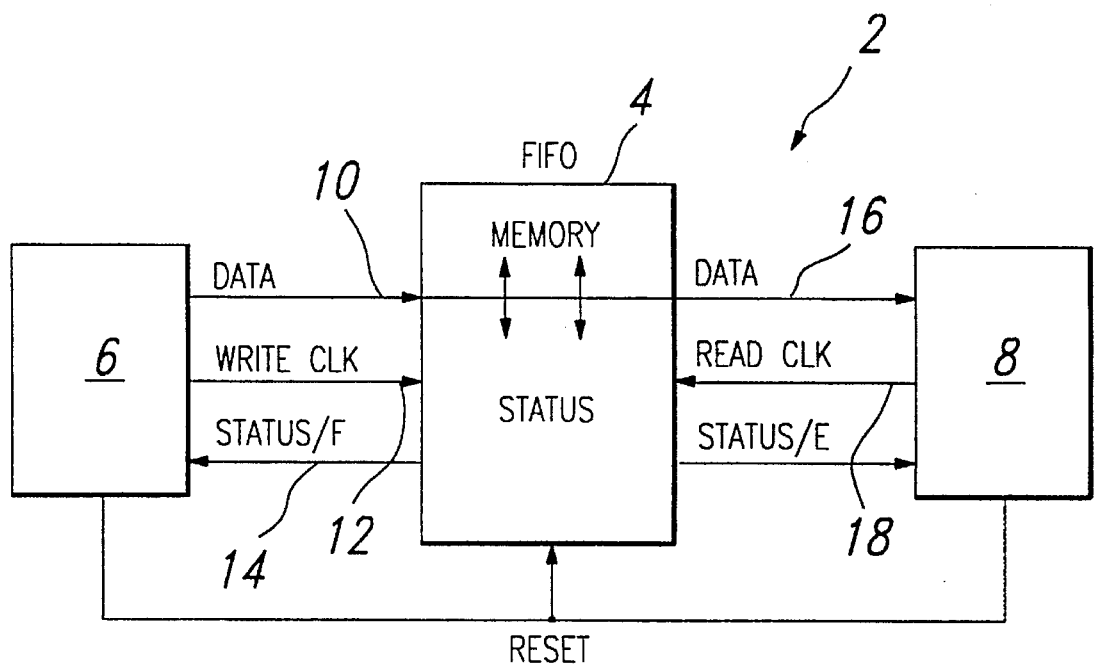
FIG. 1 is a block diagram of a data transmission system utilizing an inventive FIFO.
Figure 2:
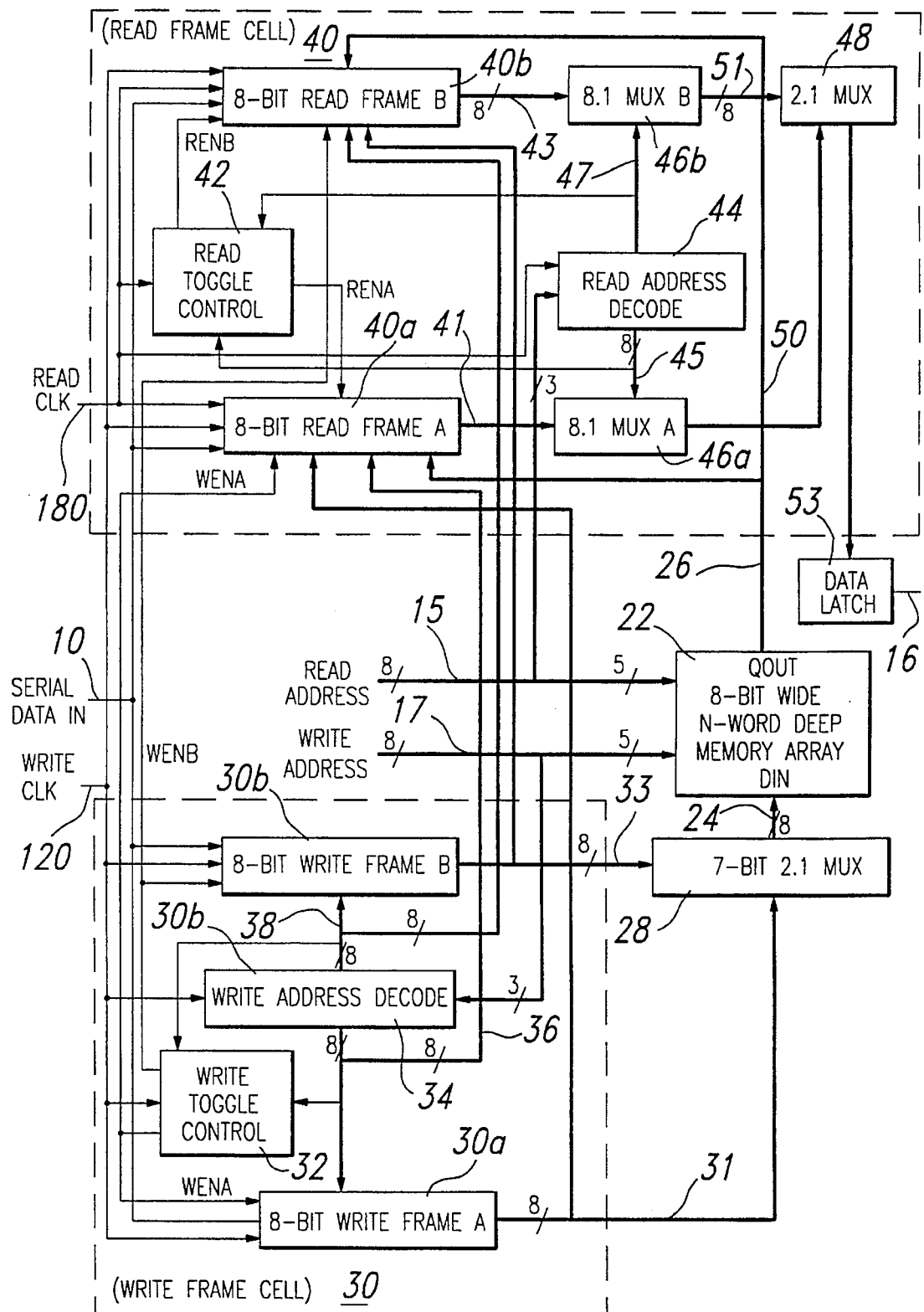
FIG. 2 is a block diagram illustrating a preferred embodiment FIFO architecture according to the invention.

Before discussing with particular detail a preferred embodiment of the invention as illustrated in FIG. 2, FIG. 1 first illustrates an example of a data transmission system wherein the invention may be advantageously employed. Data transmission system 2 includes a unique memory buffer 4 coupling a first transmission device 6 to a second transmission device 8. As will be explained in further detail below, memory buffer 4 includes a novel random access memory (RAM) based first-in, first out (FIFO) memory architecture that advantageously implements serial to parallel and parallel to serial conversions. When writing to the memory buffer, data bits are input serially into a write frame buffer where they are temporarily stored in data latches until the buffer fills whereupon the bits are written in parallel to the memory array, thus providing a serial to parallel conversion. When reading from memory buffer 4, a number of bits are accessed from the memory array in parallel and are input into a read frame buffer where they are stored temporarily in data latches until they are thereafter clocked out serially, thus providing a parallel to serial conversion. Such architecture advantageously provides a one bit wide FIFO where a data word is only one bit wide.

In FIG. 1, data transmission device 6 may be a high speed device such as a data processor and data transmission device 8 may be a slow speed device such as a cathode ray tube (CRT). The data communication is in the direction from high speed device 6 to slow speed device 8. A data processor 6 is capable of writing data into memory buffer 4 at a rate much higher than can be read by the CRT terminal 8. Data processors are capable of transmission rates in the neighborhood of 9600 bits per second, while typical peripheral components, such as CRT 8, may be capable of transmission rates of only about 1200 bits per second.

In FIG. 1, a data input 10 and a WRITE CLK signal line 12 connect transmission device 6 memory buffer 4. Data input 10 is one bit wide and provides for the serial transmission of data from transmission device 6 into memory locations within memory buffer 4. Write commands from transmission device 6 appear on WRITE CLK signal line 12 and accompany each word transmitted over data input 10. A data output 16 and a READ CLK signal line 18 connect transmission device 8 to memory buffer 4. Data output 16 is one bit wide and provides for the serial transmission of data from memory locations within memory buffer 4 to data transmission device 8 in accordance with read commands appearing on READ CLK signal line 18.

FIG. 1 illustrates other signal lines typically included in data transmission systems such as RESET and WRITE STATUS/F and READ STATUS/E. Memory buffer 4, in a preferred embodiment, is a first in, first out FIFO memory. This type of memory typically contains flags that indicate how much memory space remains available for use such as full, empty, and half full.

Turning now to FIG. 2, a preferred embodiment of the architecture of the FIFO memory buffer 4 is illustrated. As will be explained in greater detail below, the basic architecture disclosed in FIG. 2 illustrates an 8-bit wide memory configuration 22 having a 16-bit wide write frame cell 30 and a 16-bit wide read frame cell 40. This architecture advantageously allows memory 4 to function as a 256×1 or a 1 bit wide FIFO. It is to be noted that FIG. 2 is a "high level" drawing and does not disclose an entire electrical schematic diagram of the FIFO memory. For example, certain devices that are present on the FIFO, such as (for example) flag circuitry and read/write control circuitry are unillustrated in FIG. 2 for clarity.

With reference to FIG. 2, a structural description of the inventive architecture of memory buffer 4 is first provided and is then followed by a structural/functional description of various devices shown in FIG. 2. A functional description of important operational characteristics of the architecture thereafter follows.

In FIG. 2, a READ ADDRESS bus 15 and a WRITE ADDRESS bus 17 connect to a RAM 22. READ and WRITE sequential addresses are conventionally generated internally from flags within a FIFO as is readily known by one of ordinary skill in the art. RAM 22 is an 8-bit wide N word deep static random access memory array in this example therefore having an 8-bit data input DIN 24 and an 8-bit data output QOUT 26. Data input DIN 24 is coupled to a write frame cell 30 via a multiplexer 28. Data output DQOUT 26 is connected to a read frame cell 40. Data is input (written) to RAM 22 from write frame cell 30 and data is output (read) from RAM 22 into read frame cell 40.

In FIG. 2 with particular reference to write frame cell 30, write frame cell 30 includes a write toggle control device 32, a WRITE ADDRESS decoder 34, a write frame 30A and an write frame 30B. A write clock signal WRITE CLK 120 is input to write toggle control 32 and is input to write frames 30A and 30B. WRITE CLK signal 120 is derived from WRITE CLK signal 12 of FIG. 1. WRITE CLK signal 120 illustratively represents (for simplicity and clarity in FIG. 2) a composite signal of various signals produced by the READ/WRITE flow control circuitry illustrated in FIGS. 3–3d. (The copending and coassigned application of inventor Ward herein bearing Ser. No. 07/966,122 also discloses other READ/WRITE control circuitry suitable for generating WRITE CLK signal 120.) WRITE ADDRESS bus 17 is input to WRITE ADDRESS decoder 34. Serial data input 10 is input to write frames 30A and 30B.

Still with reference to write frame cell 30 in FIG. 2, WRITE ADDRESS decoder 34 is connected by a bus 36 to write frame 30A and is connected by a bus 38 to write frame 30B. Busses 36 and 38 connect into read frame cell 40. One bit from both bus 36 and bus 38 are additionally connected into write toggle control 32. Write toggle control 32 generates a write enable signal WENA for write frame 30A and a write enable signal WENB for write frame 30B. Write enable signals WENA and WENB are additionally input to read frame cell 40. Data is output from write frame 30A via bus 31 into a multiplexer 28. Likewise, data is output from write frame 30B via bus 33 into multiplexer 28. Busses 31 and 33 are additionally connected into read frame cell 40. Multiplexer 28 inputs data into RAM 22 through data in terminal DIN 24.

Now with reference to read frame cell 40 of FIG. 2, read frame cell 40 includes a read toggle control 42, a read address decoder 44, a read frame 40A, a read frame 40B, a multiplexer 46A, a multiplexer 46B and a multiplexer 48. A read clock signal READ CLK 180 is input to read toggle control 42 and is input to read frames 40A and 40B. Similar to WRITE CLK signal 120, READ CLK signal 180 represents a composite signal of various signals produced by the READ/WRITE flow control circuitry illustrated in FIGS. 3–3d from READ CLK 18 of FIG. 1. WRITE CLK 120 is additionally input to read frames 40A and 40B. READ ADDRESS 15 is input to READ ADDRESS decoder 44. Serial data input 10 is connected to read frames 40A and 40B.

In read frame cell 40 of FIG. 2, read toggle control 42 generates a read enable signal RENA for read frame 40A and a read enable signal RENB for read frame 40B. Read frame 40A receives write enable signal WENA from write toggle control 32 of write frame cell 30. Read frame 40A is additionally connected to busses 31 and 36 from write frame 30A and WRITE ADDRESS decoder 34 respectively. Data is read from read frame 40A into a multiplexer 46A via bus 41. Read frame 40B receives write enable signal WENB from write toggle control 32 of write frame cell 30. Read frame 40B additionally is connected to busses 33 and 38 from write frame cell 30B and WRITE ADDRESS decode 34 respectively. Data is read from read frame 40B into a multiplexer 46B via bus 43. Data is read from RAM 22 into read frame 40A and 40B through data out terminal QOUT 26.

Still with reference to read frame cell 40 of FIG. 2, READ ADDRESS decoder 44 is connected by a bus 45 to multiplexer 46A and is connected by a bus 47 to multiplexer 46B. One bit from both bus 45 and bus 47 are additionally connected into read toggle control 42. A bus 50 connects the output of multiplexer 46A into a multiplexer 48. A bus 51 connects the output of multiplexer 46B into multiplexer 48. The output of multiplexer 48 is connected by a bus 52 into a data latch 53. The serial data output 16 of FIFO memory buffer 4 is taken from data latch 53.

Before describing the individual devices illustrated in FIG. 2, a read/write flow controller (unillustrated in FIG. 2 for the sake of clarity) that generates composite signals WRITE CLK 120 and READ CLK 180 of FIG. 1 is first described with reference to FIGS. 3–3d. In the following description of the read/write flow controller, it is to be noted that a detailed description for a similar flow controller may be found in the U.S. Pat. No. 5,249,154 of inventor Ward et al. also assigned to Texas Instruments Incorporated and therefore a detailed explanation of the read/write flow controller 13 contained within memory buffer 4 is omitted. However, it is to be appreciated that read/write flow controller 13 represents an improvement over the flow controller described in U.S. Pat. No. 5,249,154 by the addition of circuit 130 that allows memory buffer 4 to handle partial frames of data through an operation known as "backfill" as is later described.

Figure 3:
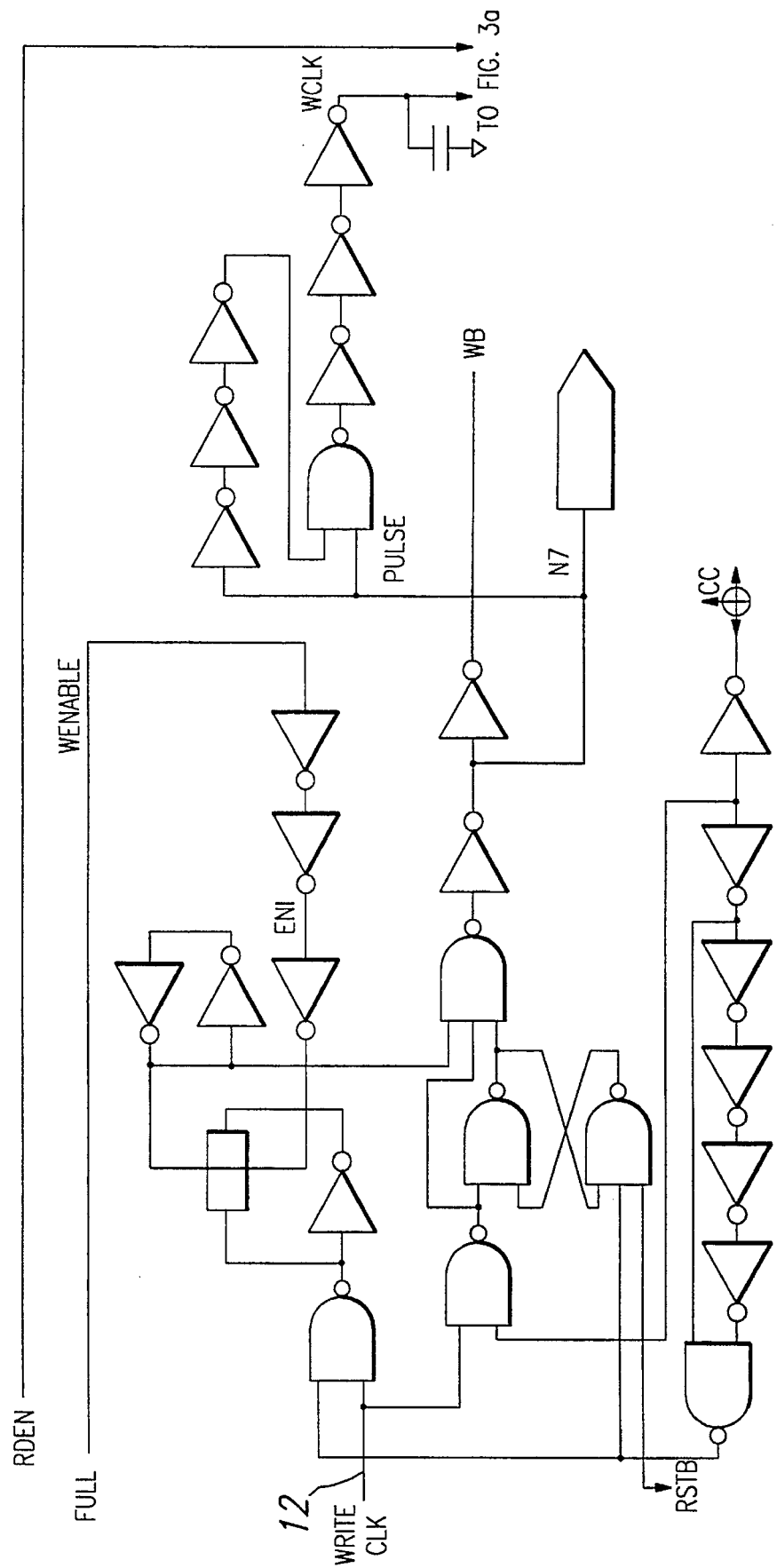
FIGS. 3–3d form a logic diagram illustrating a flow controller contained within the FIFO of FIG. 2.
Figure 3A:
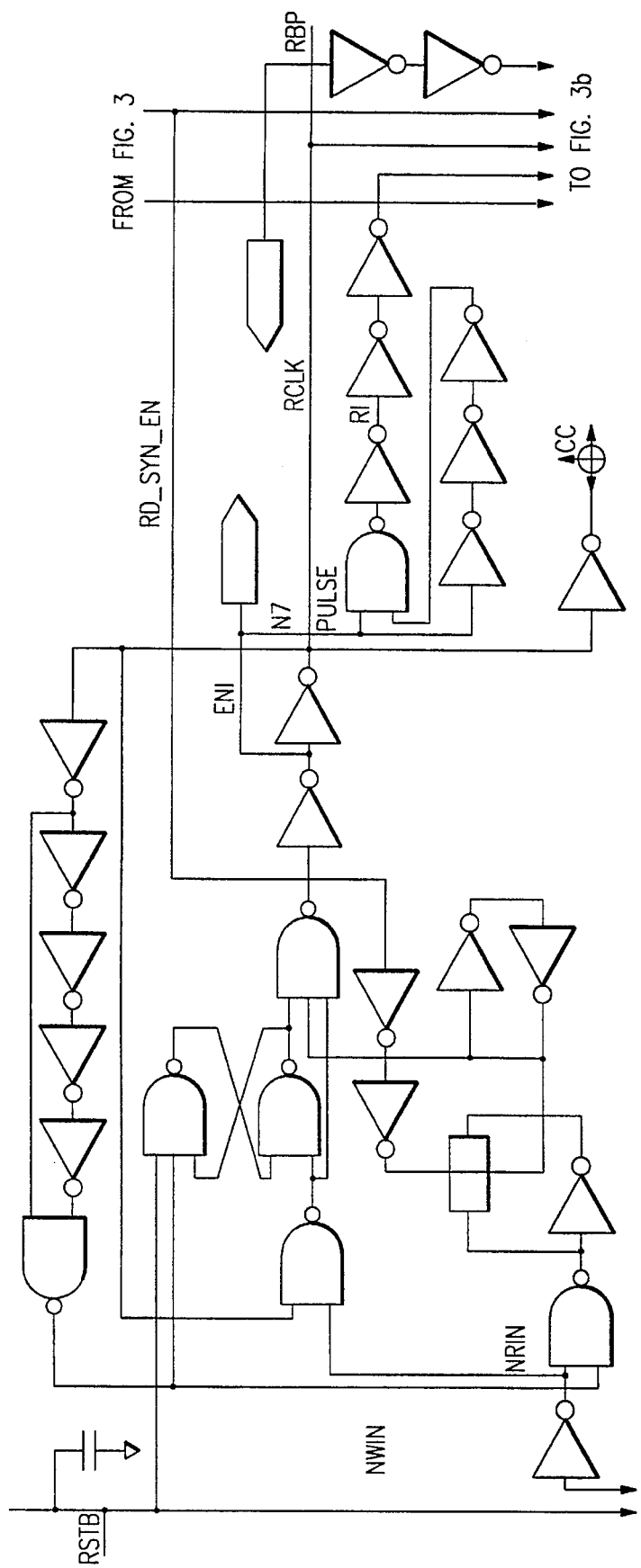
Figure 3B:
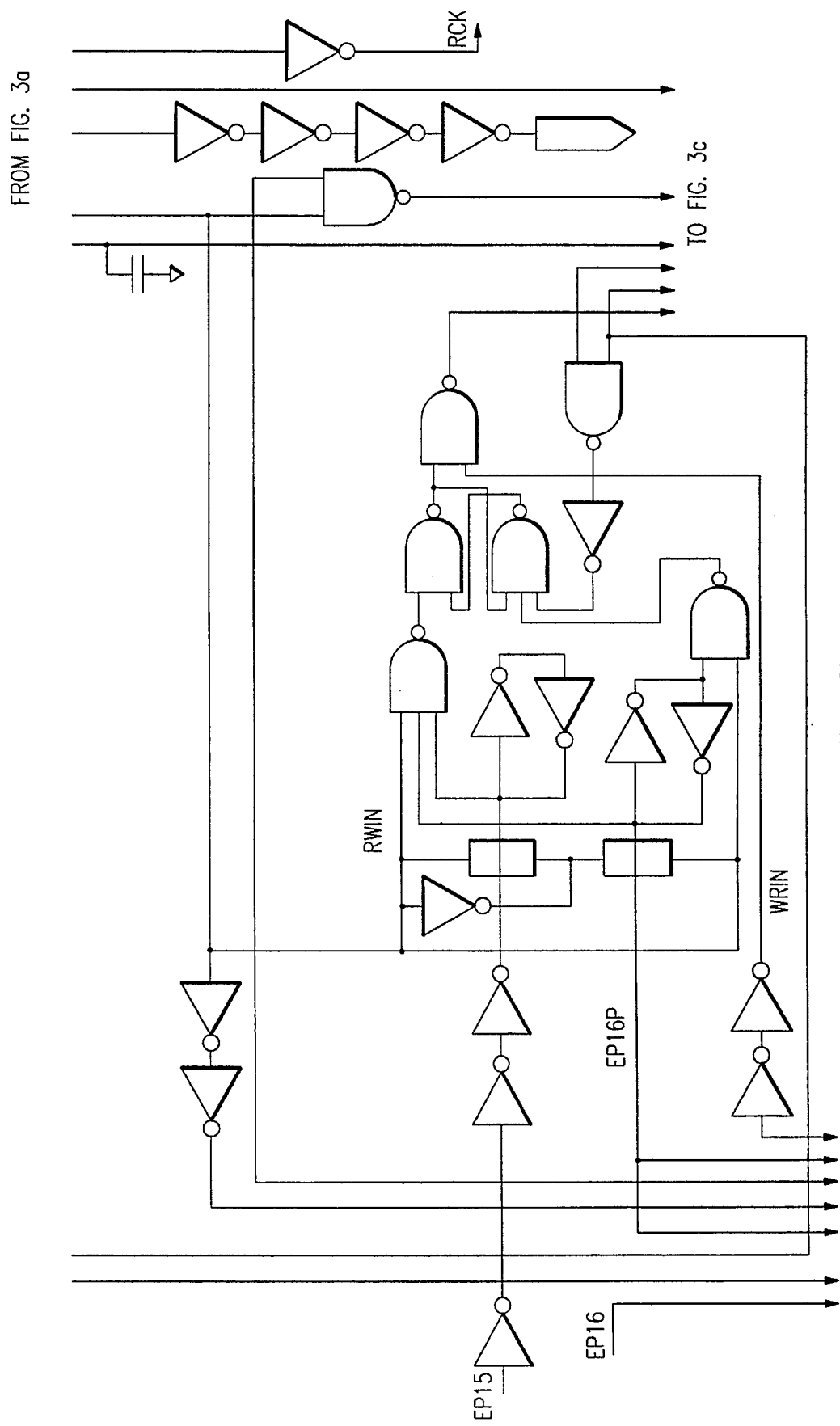
Figure 3C:
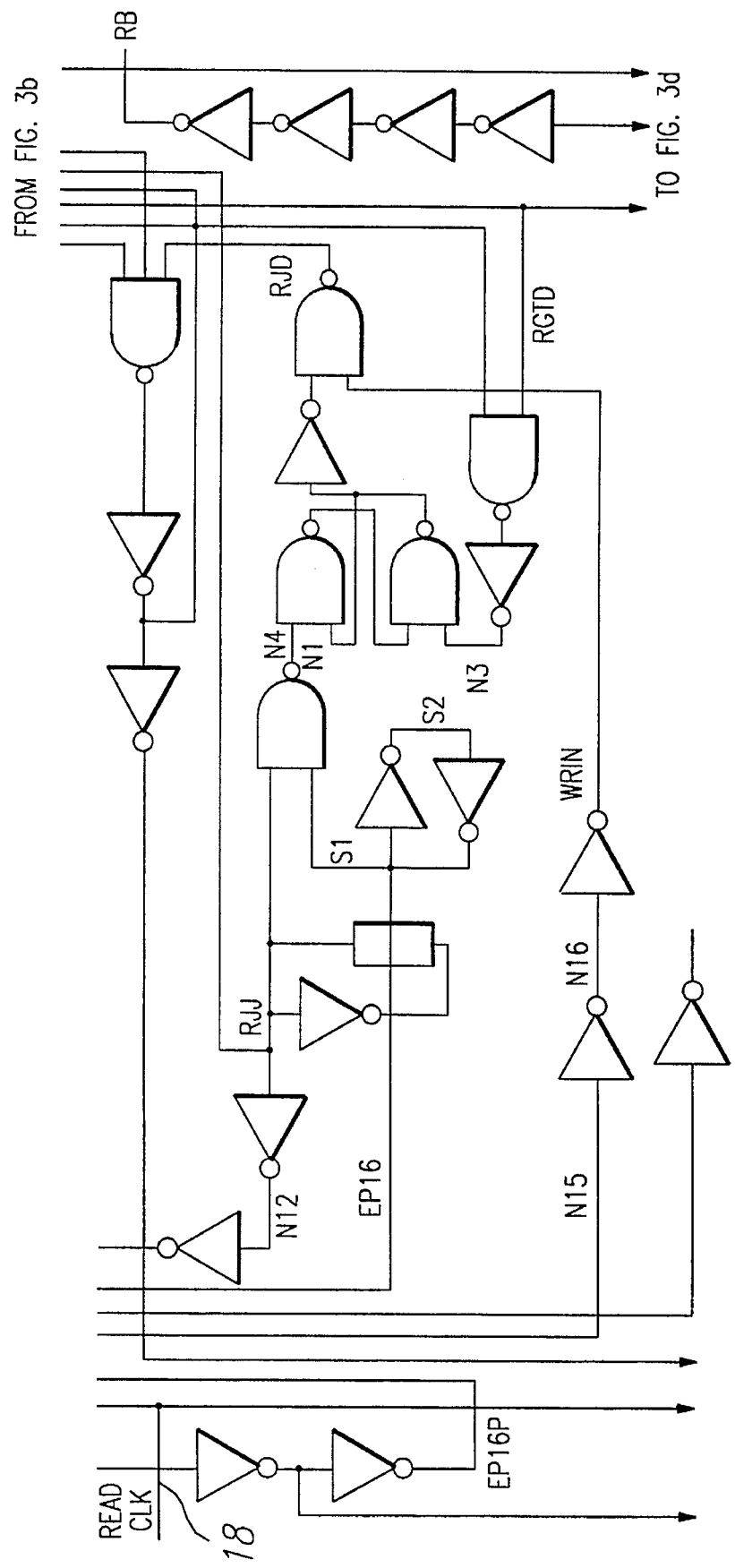
Figure 3D:
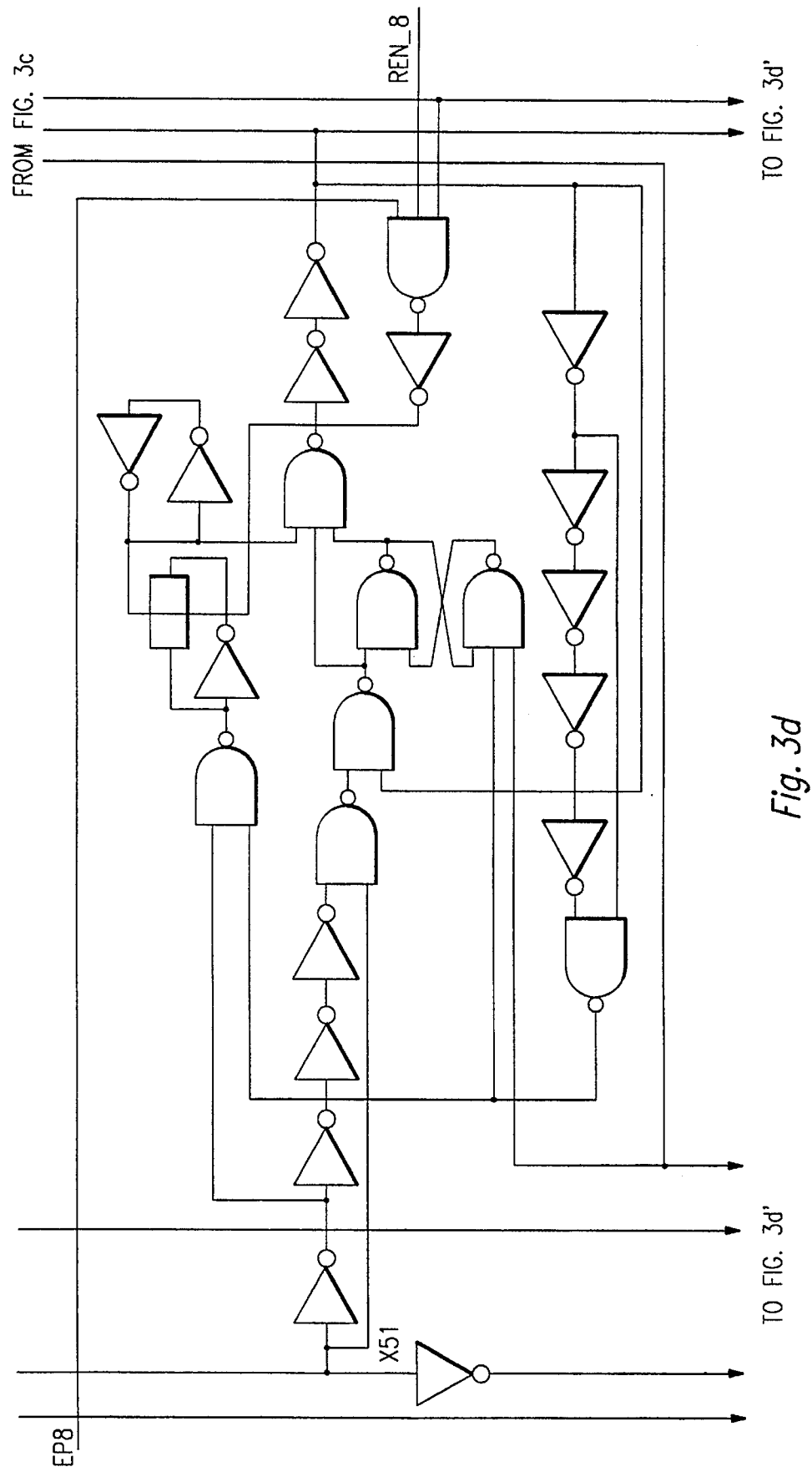
Figure 3D:
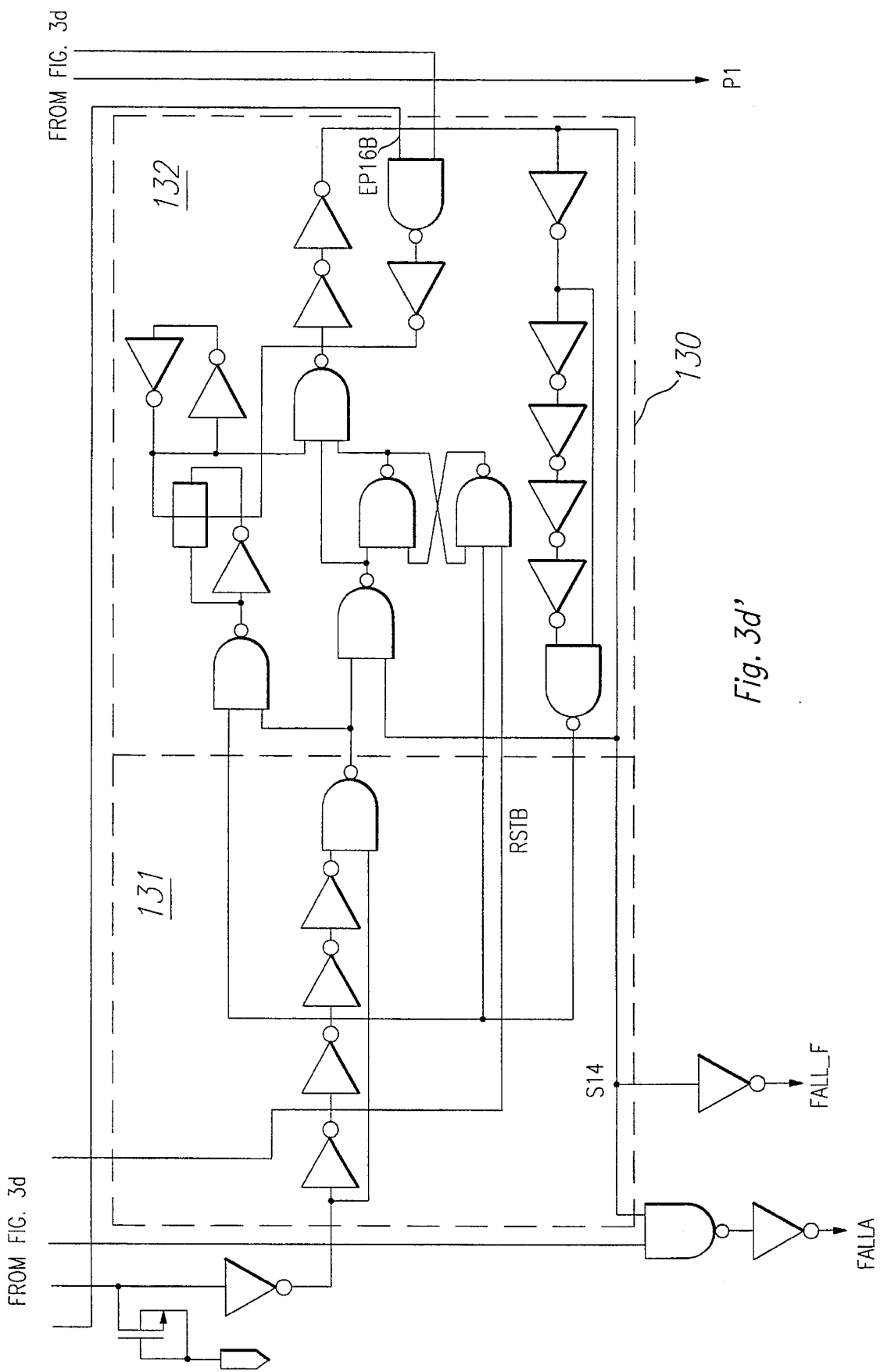

FIGS. 3–3d illustrate in partial schematic detail a read/write flow controller 13 that provides part of the READ/WRITE control circuitry for FIFO 4. Flow controller 13 receives the external READ CLK 18, the external WRITE CLK 12, and various internally generated status flag signals. In response to these signals, flow controller 13 produces signals WB, RBP, RCK, RB, P1, FALLA, and FALL_F which govern timing within the memory buffer. Signal RB indicates whether a full 8 bit word was read from RAM 22. Signal RBP is a read clock that increments flags. Signal RCK represents a delayed RBP signal and is used to increment addressing. Signal WB loads data into write frame 30 and increments addressing to RAM 22. Signal P1 blocks fall through signal FALLA. Signal FALLA is a latching signal that causes data on serial input 10 to be latched into a cell in read frame 40. Signal FALL_F is used in the "backfill" operation that is later explained. Since showing all of these signals individually on FIG. 1 would unduly complicate that figure, these signals are accordingly grouped and represented in FIG. 1 as the two composite signals READ CLK 180 and WRITE CLK 120. The individual signals produced by flow controller 13 are, however, illustrated on schematic FIGS. 5, 6, and 7.

With further reference to flow controller 13 illustrated on FIGS. 3–3d, the read/write flow controller 13 basically determines where data generally comes from and where generally data goes to. If a WRITE occurs on WRITE CLK 12, without arbitration, flow controller 13 issues WRITE CLK 120 which causes write toggle control 32 to toggle on the eighth clock signal it receives and flow controller 13 causes an address increment to appear on write address 17. Similarly, for a READ appearing on READ CLK 18, flow controller issues READ CLK 180 which causes read toggle control 42 to toggle on the eights clock signal it receives and flow controller 13 causes an address increment to appear on read address 15.

Figure 4:
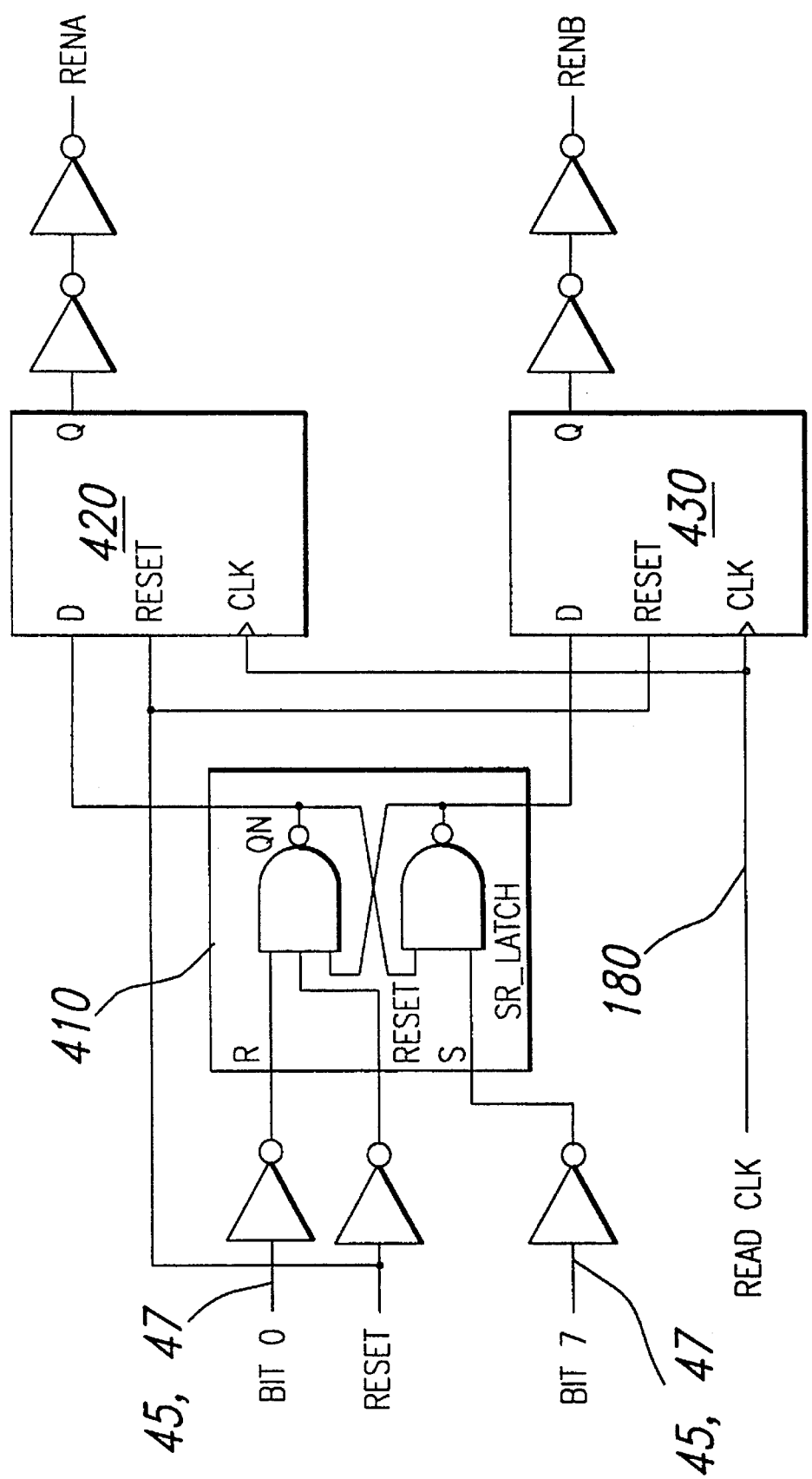
FIG. 4 is a logic diagram illustrating read toggle control circuit 42 of the FIFO of FIG. 2.

Turning now with particular detail to individual devices shown in FIG. 2, FIG. 4 discloses the read toggle control circuit 42. Read toggle control circuit 42 includes a cross coupled S R latch 410 and a pair of D type flip flops 420 and 430. Cross coupled latch 410 receives as inputs 1 bit each from bus 45 and bus 47. READ CLK 180 clocks flip flops 420 and 430. The circuit produces two read enable signals, RENA and RENB, that allow read frame cell 40 to jump, or toggle, between read frame 40A and read frame 40B. For example, assuming that 8 bits already exist in read frame 40A and a full 8 bit word exists in RAM 22, bits 1–8 are read out serially from read frame 40A. On the 8th READ CLK 180, a full 8 bit word is read from RAM 22 to read frame 40B in parallel, that frame becomes enabled for reads of data to the output, and data is read out serially on the next clock. Similarly, on the last (8th) read clock of that frame, if a full word is available in RAM 22, it gets read in parallel to the opposite frame, 40A, and serial read control is toggled to it. This operation continues as long as there are full 8 bit words in memory RAM 22. Neither WRITE nor READ to and from memory RAM 22 occur in any partial (<8) words. If there does not exist a complete 8 bit word in RAM 22, then either the FIFO is empty, or there is a partial frame being written to (write frame 30A or 30B) and these bits are singly transferred using busses 33 and 31.

Write toggle control circuit 32 of FIG. 2 is unillustrated in logic detail because it is similarly constructed as read toggle control circuit 42. It is clocked, however, by WRITE CLK signal 120 and receives as 1 bit each from bus 36 and bus 38. The circuit is operable to produce two write enable signals, WENA and WENB, that allow write frame cell 30 to jump, or toggle, between write frame 30A and write frame 30B so that several bits are stored until they will be written into RAM 22. When writing data into RAM 22, WENA enables write frame 40A so that 8 bits are sequentially written into write frame 30A. Upon writing the 8th bit into write frame 30A, write toggle control 32 disables signal WENA and enables signal WENB which consequently enables write frame 30B to accept the next 8 bits.

Figure 5A:
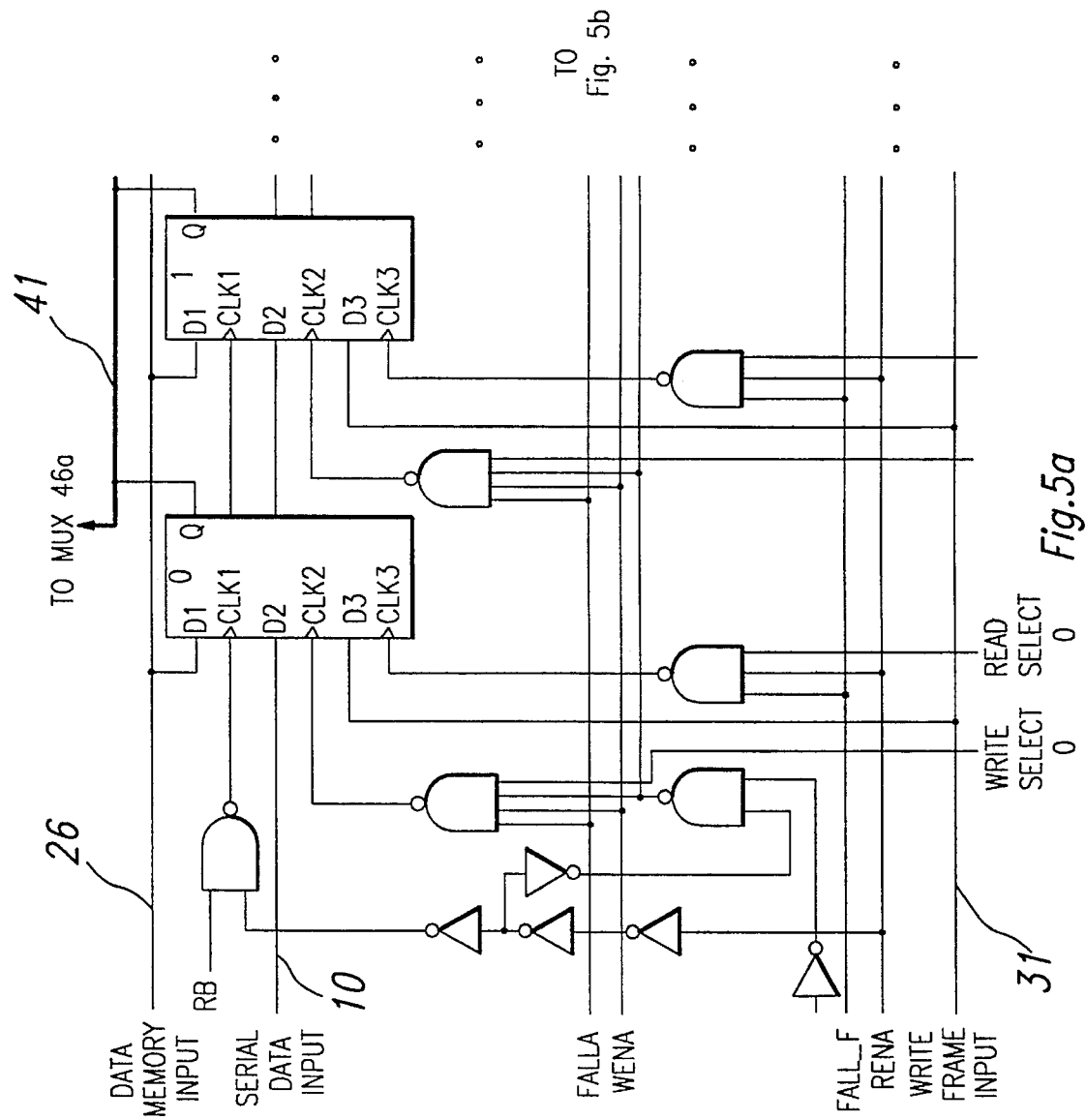
FIG. 5 is a logic diagram illustrating read frame cell 40A of the FIFO of FIG. 2.
Figure 5B:
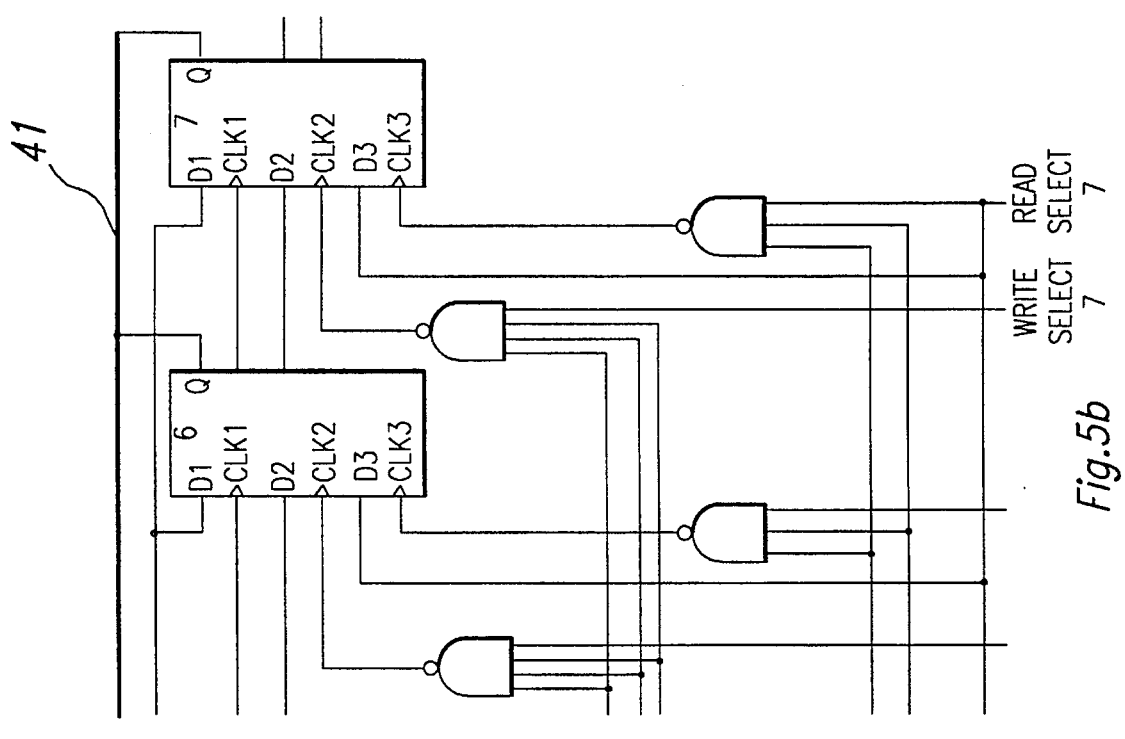

FIG. 5 discloses read frame 40A in logic detail. (Because read frame 40B is similarly constructed, its schematic is omitted.) Read frame 40A is a series of data latches, registers, 0 through 7. These latches may obtain data from 3 different input sources, depending upon operating conditions. The signals RB, FALLA, and FALL_F from flow controller 13 and the signals WENA and RENA respectively from the write toggle control 32 and the read toggle control 42 enable the data latches so that they are appropriately clocked to receive data from the appropriate input.

With reference to FIG. 5, serial data input 10 is connected to data input D2 of the data latches. If memory buffer 4 is close to empty, read frame 40A may obtain data directly from the buffer's input pads through serial data input 10. In this type of condition, the first 16 bits serially received (8 bits received by read frame 40A and 8 bits received by read frame 40B) are preloaded to output registers of data latch 53 so that the bits are immediately available for output. Hence, a serial data output port is provided. A second input to read frame 40A is data coming from RAM 22 over bus 26 which is connected into data input D1 of the data latches. This provides a full 8 bit parallel input into read frame 40A. A third input to read frame 40A is data coming from write frame 30A over bus 31 which is connected into data input D3 of the data latches. (Write frame 30A is also 8 bits wide.) The data output Q of latches 0–7 connect to bus 41 so that output data is provided to multiplexer 46A.

Figure 6:
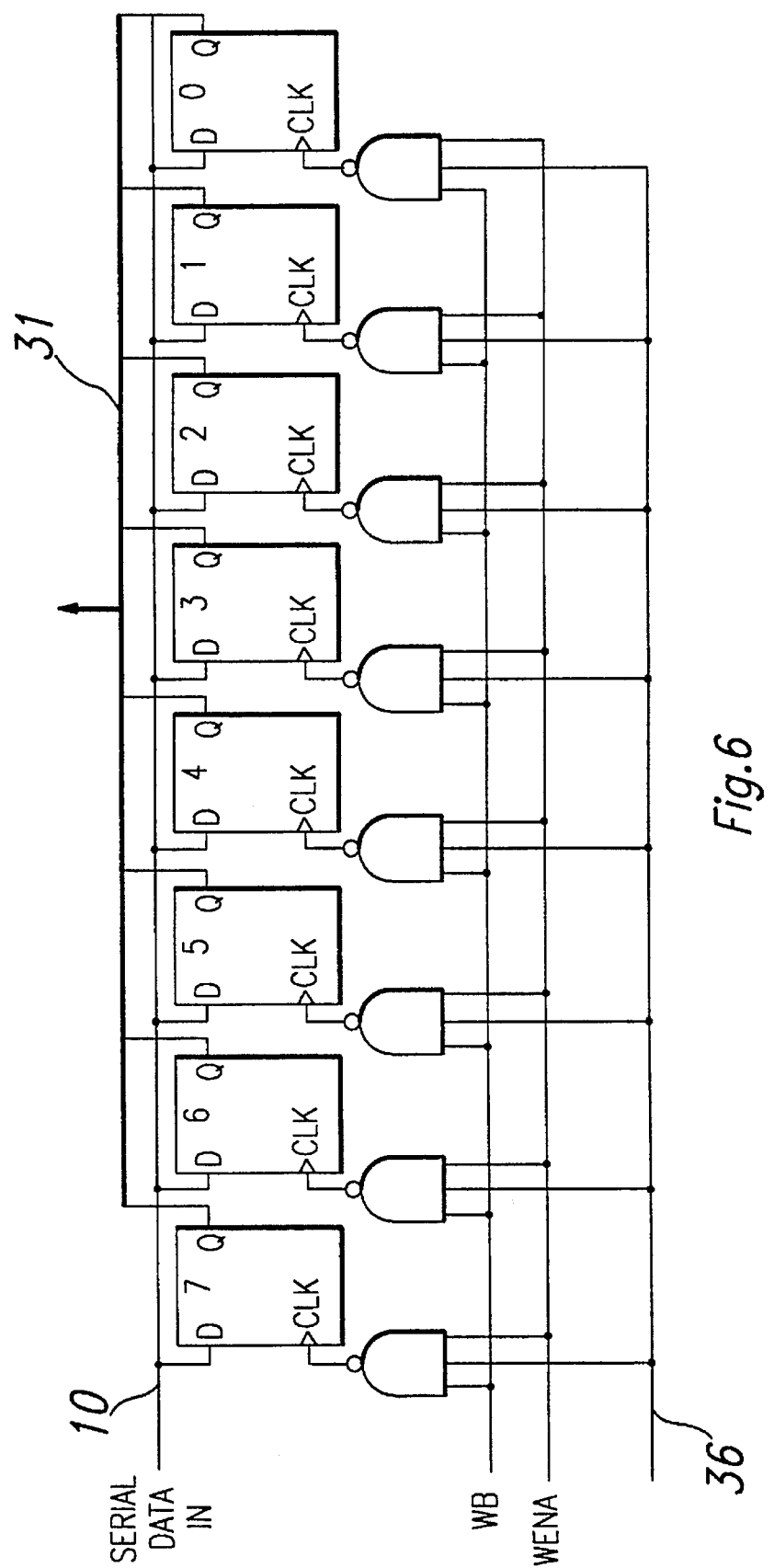
FIG. 6 is a logic diagram illustrating write frame cell 30A of the FIFO of FIG. 2.

FIG. 6 illustrates in logic detail write frame 30A. (Because write frame 30B is likewise constructed, its schematic is omitted.) Write frame 30A contains a set of data latches, registers, 0–7. Serial data is written into the latches by virtue of the connection of serial data in 10 to the D latch inputs. Signal WB from flow controller 13 and signal WENA from write controller 32 clock the data from the latches to bus 31 while bus 36 provides appropriate selection from addresses decoded by WRITE ADDRESS decode 34.

Figure 7:
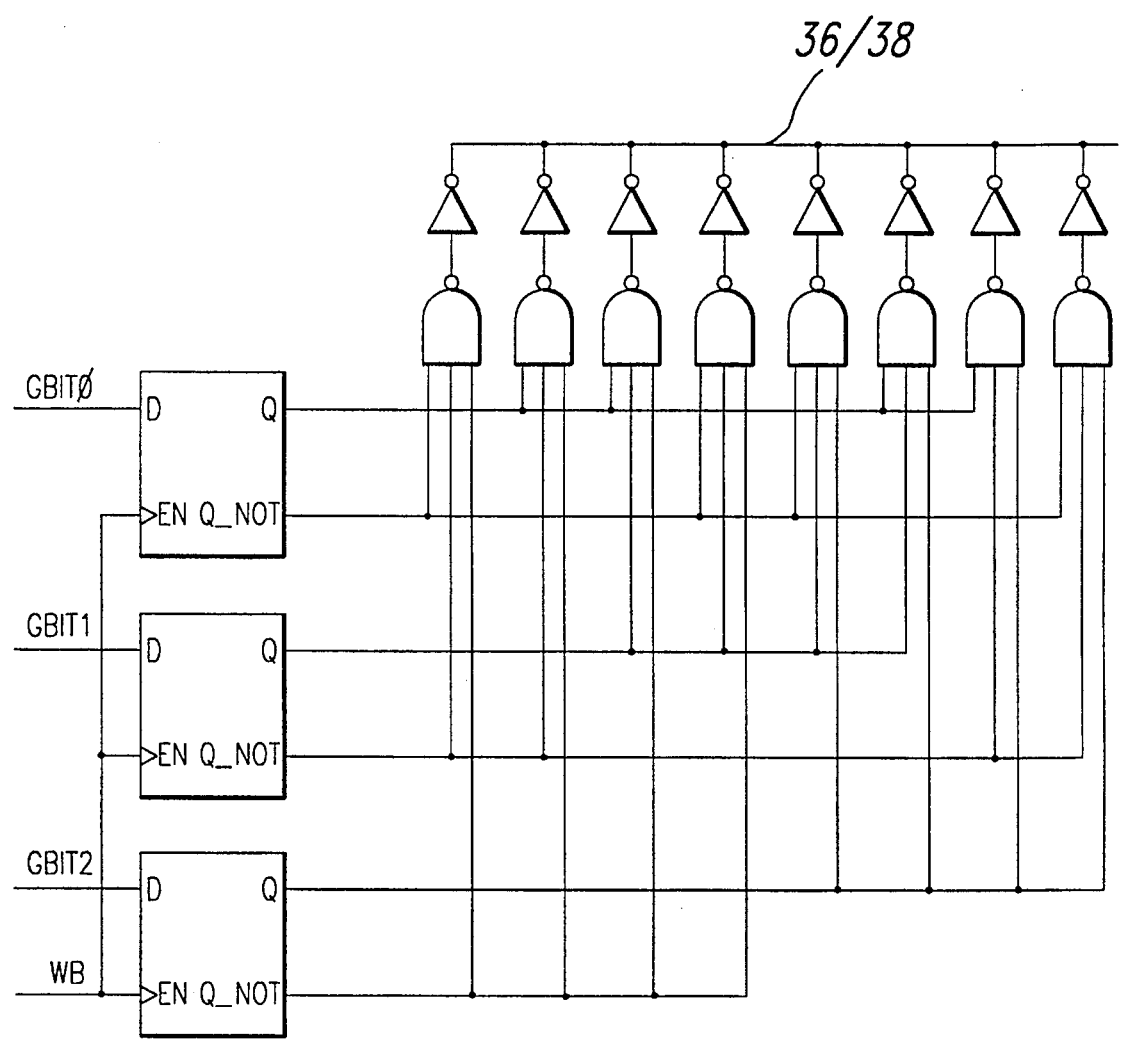
FIG. 7 is a logic diagram illustrating WRITE ADDRESS decoder (pointer) 34 of the FIFO of FIG. 2.

FIG. 7 is a logic diagram illustrating WRITE ADDRESS decoder, pointer, 34. (Decoders are typically referred to as "pointers" by FIFO designers.) Three D flip flops receive "gray code" bit information and together with the additional illustrated logic convert the 3 input gray code data into 1 of 8 pointer information that is provided via bus 36 to write frame 30A and read frame 40A and via bus 38 to write frame 30B and read frame 40B. U.S. Pat. No. 5,084,841 issued Jan. 28, 1992 entitled "Programmable Status Flag Generator FIFO Using Gray Code" to inventor Ward et al. and assigned to Texas Instruments Incorporated provides ample detail regarding gray code generation.

READ ADDRESS decoder circuitry 44 is unillustrated—it is constructed similar to WRITE ADDRESS decoder circuitry 34.

Figure 8:
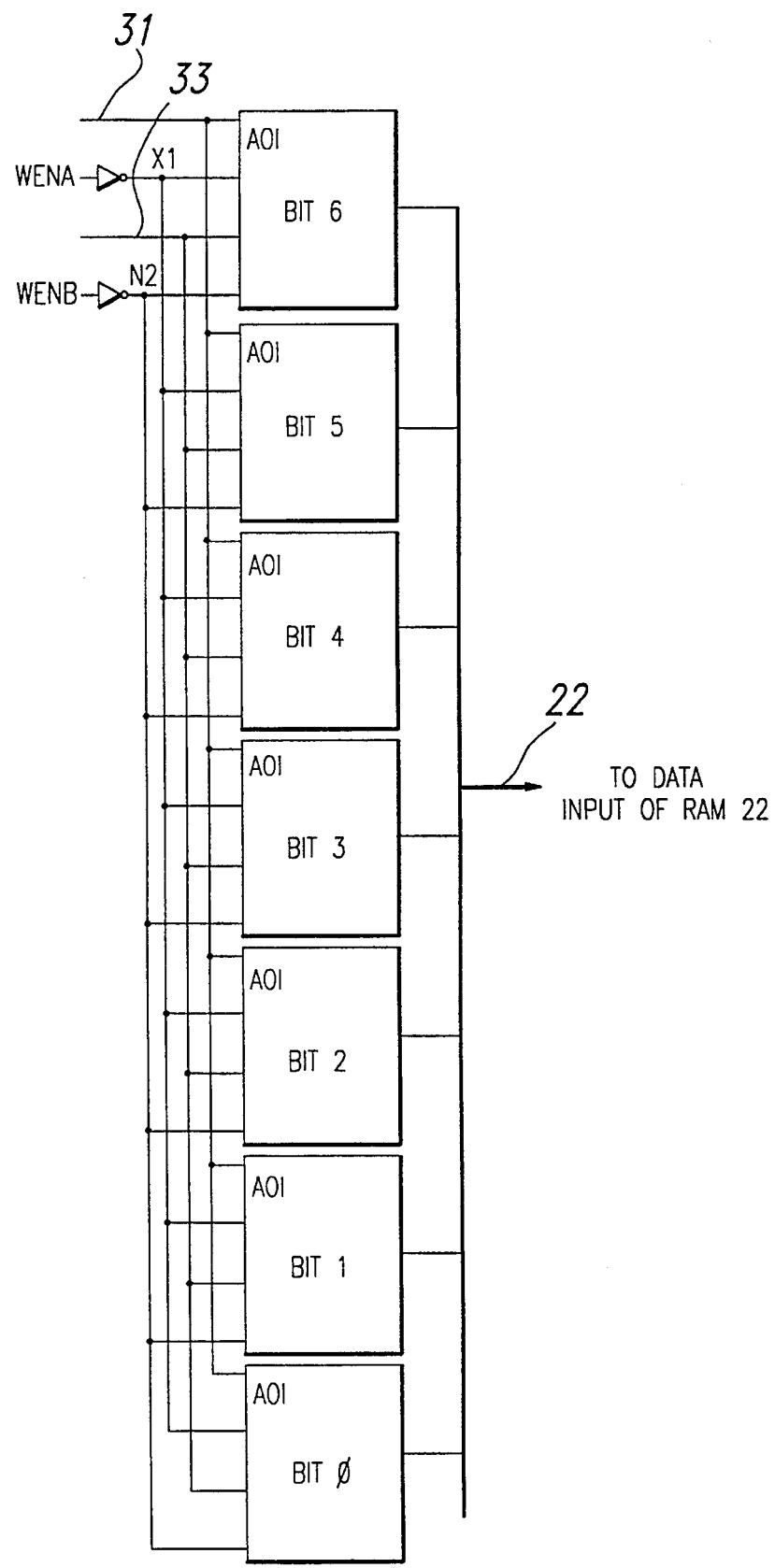
FIG. 8 is a logic diagram illustrating multiplexer 28 of the FIFO of FIG. 2.

FIG. 8 discloses the multiplexer circuit 28. Multiplexer 28 is a 2 to 1 multiplexer containing 7 cells. Each cell is an AOI (AND OR INVERT) standard data pipeline as disclosed in FIG. 9. Busses 31 and 33 each provide 8 bits into multiplexer 28 respectively from write frames 30A and 30B. During a WRITE operation, write toggle control 32 enables signal WENA which causes multiplexer 28 to provide the first 7 bits from write frame 30A. When the 8th bit from write frame 30A comes on bus 31, it "falls through" so that it and the first 7 bits are piped (written) into RAM 22. This provides faster data input into RAM 22 because it is not necessary to store the 8th bit. After writing the data from write frame 30A into RAM 22, write toggle control 32 disables signal WENA and toggles, or enables, signal WENB, so that write frame 30B is enabled and its data is likewise provided to multiplexer 28 and accordingly written into RAM 22.

Figure 9:
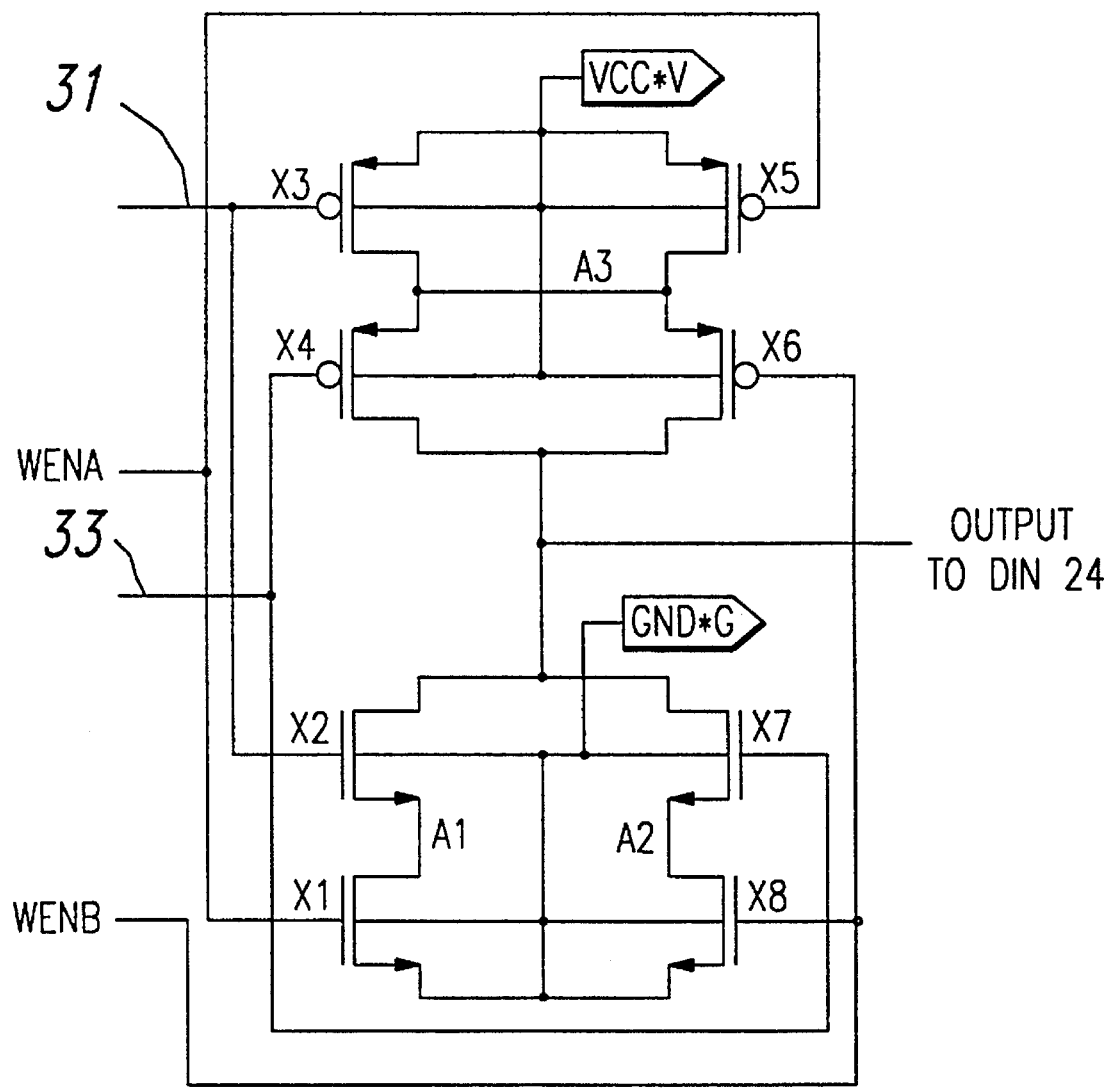
FIG. 9 is an electrical schematic diagram illustrating an AND OR INVERT device formed within multiplexer 28 of FIG. 8.

Multiplexers 46A and 46B are not shown in detail because they are standard 8 to 1 multiplexers. Multiplexer 48 is unillustrated in detail because it is a 2 to 1 multiplexer having one cell constructed in the AND OR INVERT fashion as shown in FIG. 9. Mulitplexor 48 provides one output which is stored into data latch 53. Data latch 53 is also unillustrated schematically in detail because it is a standard data pipeline.

A discussion of the functional operation of the inventive FIFO architecture illustrated in FIG. 2 is now provided.

In general, as illustrated in FIG. 2, the basic architecture provides an 8-bit wide memory configuration. (Of course, the memory configuration could be wider.) The architecture includes a 16 bit wide write frame cell 30 and a 16 bit wide read frame cell 40. The 16 bit wide write frame cell 30 is comprised of two 8-bit wide frames 30A and 30B that are addressed by one decode signal from WRITE ADDRESS decode 34 and are switched by a toggle control signal from write toggle control 32. Single bit data is input to write frame 30 serially via serial data in bus 10 that is connected to all write frame latches. Only one write frame 30A or 30B data cell will be selected for a bit to be written to when a WRITE occurs on WRITE CLK 120. All 8 bits of write frame 30A or 30B are multiplexed 2 to 1 in multiplexer 28 and written in parallel to RAM 22 depending on whether write frame 30A or 30B is selected by the write toggle control 32. The 16 bit wide read frame cell 40 is similar to write frame 30 as far as number and size of frames. However, data is provided from RAM 22 to read frame 40 in parallel in 8-bit wide words. The read frame outputs 40A and 40B are multiplexed 8 to 1 in multiplexers 46A and 46B selected by a decode from read address decode 44. The read frame outputs are further multiplexed 2 to 1 in multiplexer 48 selected by read toggle control 42 and thereafter serially output through data latch 53. Data may be additionally written serially into read frame 40 from serial data input 10 when selected by write frame pointer 34. Read frame cell 40 also includes capabilities for serial "fall thrus" that are selected by the read frame pointer 44.

The operation of memory buffer 4 of FIG. 2 is now explained with particular reference to a WRITE operation.

The memory buffer architecture is such that data is initially written serially into write frame 30 and is thereafter written in parallel into memory 22. Upon receiving an external WRITE command on WRITE CLK 12, flow controller 13 generates WRITE CLK 120 and write address information on WRITE ADDRESS bus 17. WRITE CLK 120 plus a single bit from bus 34 or bus 38 causes write toggle control 32 to generate an enable signal WENA or WENB. Assume signal WENA is generated. Signal WENA is connected, through the logic illustrated in FIG. 6, to the clock inputs of the data latches forming write frame 30A. Write address decoder 34 decodes the write address information on bus 17 and inputs this information to the clock inputs of the data latches within read frame 30A. Hence, on every WRITE CLK 120 signal when there are less than 16 bits difference between a READ and a WRITE, (ie. near empty conditions), an input bit that is present on serial data input 10 is loaded into a flip-flop of one of the write frames 30A. The bits are sequentially loaded, depending upon depth status, into write frame 30A. On the 8th WRITE CLK 120 signal, the previous 7 latched bits in the frame together with the eighth bit on serial input data 10 eighth bit are transferred in parallel over bus 31 to RAM 22. Following the 8th WRITE CLK 120 signal, the address information from write address decoder 34 for write frame 30 is toggled by write toggle control 32 from write frame 30A over to write frame 30B via enable signal WENB so that data on data in 10 continues to be serially written into the data latches of write frame 30B. When write frame 30B fills up (8 WRITE CLK 120 signals later), the data within write frame 30B gets written into RAM 22 8 bits at once (in parallel) with write toggle control 32 disabling signal WENB and enabling signal WENA, thereby returning control to write frame 30A. Thus in a WRITE, only entire 8 bit words are written into RAM 22. No partial frames (less than eight valid words) are written.

The operation of FIFO memory 4 of FIG. 2 is now explained with particular reference to a read operation.

In the following description, it is to be understood that read toggle control 42 functions in similar fashion to write toggle control 32 to issue read enable signals RENA and RENB that help enable read frames 40A and 40B to output data, and, consequently therefore, the following description omits such switching details that will be readily understood by those of ordinary skill in the art having reference to FIG. 4.

Access to RAM 22 may be had only by full 8-bit words. Depending on the status of FIFO memory 4, data will be provided to the read frames 40A and 40B from one of three inputs: a first serial data input from serial data input 10; a second parallel data input from RAM 22; and, a third parallel data input from write frame 30) via busses 33 and 31.

With reference to inputting data from serial data in 10 into read frame 40, this operation essentially mirrors that of writing information into write frame 30 and is controlled by the write frame circuitry. WRITE CLK signal 120 is connected to read frame cell 40 along with write toggle control signals WENA and WENB and with information from WRITE ADDRESS decoder 34 via busses 36 and 38. On the first sixteen WRITE CLKs, the data bits from serial data in 10 that are written into write frame 30 are also directly written into read frame buffer 40. After sixteen write occurrences, such as in write seventeen, memory buffer 4 no longer writes data from serial data in 10 into read frame 40 because read frame 40 is full. So, if a read request from device 8 of FIG. 1 and a write request from device 6 of FIG. 1 are separated by more than sixteen WRITE CLK 120 signals, and read frame 40 is full, memory buffer 4 cannot write any more into read frame 40. However, if less than 16 bits are stored in read frame 40 and a WRITE command occurs, that bit will be directly written into read frame 40 using write pointer 34. This advantageously allows partial frames that were written into 30A/30B (as for example, only 4 bits were written and then reads began) to be available at the data latch output 53. Upon receiving a RESET signal, the first 16 bits present on serial data in 10 are likewise written to the read frames 40A/40B using write address pointer 34 and write toggle control 32.

With respect to inputting data into read frame 40 from write frame 30, write frame 30 functions as an overflow buffer for read frame 40 when it is full and also functions to provide data to read frame 40 when a READ occurs and read frame 40 is not full. If read frame 40 is not full, there are less than 16 bits in read frame 40, and device 8 of FIG. 1 issues a READ, then enough bits from write frame cell 30 will "fall thru" to the last (empty) read frame location reads so that these locations are filled with data that can be output. (Recall that data is output from memory buffer 4 in full 8-bit words). If a condition occurs where no data latches are available in read frame 40 for additional bits to reside (read frame 40 is full) and there is also not a full write frame to send to memory 22, write frame 30 holds the bits intended for read frame 40. For example, after a RESET, both read frame 40 and write frame 30 would be empty. If 16 WRITE CLKs occurred, 16 bits would be written into read frame 40 as they were written into write frame 30 as explained above. However if 4 more WRITE CLK's occurred (for a total of 20 WRITE CLK's) with no intervening READ CLK's, the next four data bits from serial data in bus 10 could not be written into read frame 40 as it would be full. These four data bits would reside in write frame cell 30 only, it functioning as an overflow for read frame 40. These bits, however, need to be transferred to read frame cell 40 when a location becomes available so they can get to the output. The following discussion explains how a "backfill" operation makes such overflow data bits available.

Assume memory buffer 4 performs seventeen WRITES and then a READ occurs. Memory buffer 4 clocks an empty location in read frame 40 out—it has emptied one location in read frame 40. But now, a bit exist that must be put back in the empty data latch of read frame 40; the seventeenth bit must be put back. The seventeenth bit can possibly come from two different locations, serial data in 10 or write frame 30. It can come from serial data in 10 if the last WRITE and the READ are close together. If the last WRITE and the READ are close together, the data on serial data input 10 going into write frame. 30 is directly written into the empty location in read frame 40 as explained above. If, however, the last WRITE and the READ are separated by an approximately large amount, say (for example) approximately 10 to 15 nanoseconds, then the empty location within read frame 40 can be filled with data from write frame 30 in a "backfill" operation.

Anytime more than 16 bits are contained in RAM 22 and a READ occurs, read frame 40 gets a data bit from write frame 30 regardless whether it is good data or not. When a RAM 22 memory READ occurs, memory buffer 4 will replace the frame (read frame) with accurate data. If the difference is more than thirty two, then the data being written into write frame 30 is not the data that is needed for backfill. Between seventeen and thirty two, the data is good data, but above thirty two the data being backfilled is not good (ie. out of sequence). This is because if the difference is more than thirty two, or more than a 2 word difference, the READ is going to obtain data from RAM 22 anyway and is therefore going to overwrite any incorrect backfill data.

With respect to inputting data into read frame 40 from RAM 22, entire 8-bit words can be loaded in parallel from RAM 22 if there more than 16 words exist in FIFO 4. Read frame 40 works on the same principle as write frame 30 in that when the last bit of a frame 30A/40A or 40A/40B is read, a full 8-bit memory word (if available) is input to the opposite frame. Although the 8-bit word must get to the output before the next clock, the read bit lines do not have to be fully recovered before the next clock. Memory 22 will not be accessed again for at least another 8 clocks.

Discussion is now turned with reference to read/write flow controller 13 partially illustrated in logic detail in FIGS. 3–3d. In addition to providing WRITE CLK 120, READ CLK 180, read address information on READ ADDRESS bus 15, and write address information on WRITE ADDRESS bus 17, flow controller 13 aids in providing status flags for memory buffer 4.

When signal EP8, empty plus eight, of FIG. 3d is high and when memory buffer 4 gets to the end of a read frame, a READ from memory occurs to obtain the next 8 bits. Flow controller 13 handles the case where the last bit of a frame is WRITTEN (which loads the word into memory 22) and then a READ occurs of that word. FLOW controller 13 determines whether a full word exist in memory 22 and if so, gets the word from memory 22 and loads it to the output 53, or not, depending upon the relative timing. If flow controller 13 doesn't obtain a full word from memory 22, it will cause a fall-thru of the last bit to the output so that the last bit is available in read frame 40.

When WRITING directly into read frame 40, as seven out of the 8 bits are loaded into read frame 40, if a near simultaneous WRITE/READ occurs, flow controller 13 will either get the full word from memory 22, if the WRITE happened first, and load it into read frame 40 (so it will overwrite the first eight bits with data in memory so that it is the same data) or, flow controller 13 will cause a fall-thru to occur from data input 10 into read frame 40 for the last bit depending upon the relative timing of the READ and WRITES. The signal FALLA tells memory buffer 4 to do a fall-thru and load read frame 40 from serial data in. This is advantageous for the case where the last bit of a frame is WRITTEN and a READ occurs very quickly thereafter. If the data is not yet present in memory 22, flow controller 13 causes a fall-thru from serial data input 10 to read frame 40.

As earlier discussed, read/write flow controller 13 represents an improvement over the flow controller described in U.S. Pat. No. 5,249,154 by the addition of circuit 130 illustrated in FIG. 3d. Circuit 130 that enables memory buffer 4 to handle partial frames of data through the backfill operation explained above. Circuit 130 has two inputs. One is Flag EP16, representing empty plus 16, and the other is the system pad clock input RD_SYN_EN. Circuit 130 includes a metastable reduction scheme portion 131 that performs a skew on the system pad clock edge and includes portion 131 that generates FALL_F, the backfill latching signal. Circuit detects WRITE occurrences greater than sixteen and generates FALL_F when WRITING or READING the seventeenth bit. If a READ occurs and there are more than 16 bits, it generates the FALL_F signal.

The FIFO architecture illustrated in FIG. 1 advantageously allows serial input to a temporary storage element of a fixed width (frame), of n bits wide, and then writing and reading from the RAM in entire n bit wide frames. Data read in parallel from the RAM is then provided serially to the output. This allows for faster frequency of operation as the RAM is accessed only once every n clock cycles and advantageously allows for accessing the RAM in the FIFO in parallel while serially writing and reading to the FIFO's inputs and outputs respectively.

The inventive architecture solution makes it possible to reduce overall chip area. It is not necessary to address RAM memory 22 individually when serially writing data into it as with prior art FIFO's. Such addressing takes quite a bit of pointers (decoders). The inventive architecture significantly cuts the address by eight by converting serial input to parallel input.

The inventive architecture makes it possible to obtain a one bit wide FIFO. Memory buffer 4 is effectively a 256×1 FIFO where the word is only one bit wide.

While the invention has been described with reference to illustrative embodiments, this description is not intended to be construed in a limiting sense. Various other embodiments of the invention will be apparent to persons skilled in the art upon reference to this description. It is therefore contemplated that the appended claims will cover any such modifications of the embodiments as fall within the true scope and spirit of the invention.

What is claimed is:

1. A first-in, first-out memory device, comprising:
   a memory array;
   a read frame buffer coupled to the memory array; and
   a write frame buffer coupled to the memory array and connected to the read frame buffer.

2. The first-in, first-out memory device of claim 1 wherein the write frame buffer comprises:
   a first set of data latches;
   a second set of data latches; and
   a write toggle control circuit coupled to both the first set of data latches and the second set of data latches.

3. The first-in, first-out memory device of claim 2 wherein the write frame buffer additionally comprises:
   a write address decoder coupled to the first set of data latches, the second set of data latches, and the write toggle control circuit.

4. A first-in, first-out (FIFO) memory device arranged for serial to parallel and parallel serial data conversion, comprising:
   a memory array for storing data;
   a write frame buffer for receiving serial data input and for writing, in parallel, the received serial data input to the memory array; and
   a read frame buffer for receiving data output from the memory array in parallel and for outputting, serially, the received data output from the memory array, and, for receiving serial input data.

5. The FIFO memory device of claim 4 wherein the read frame buffer is additionally for receiving backfill data from the write frame buffer.

6. A cache serial first-in, first out (FIFO), comprising:
   a FIFO, having a serial data input for transferring data into the FIFO, a memory coupled to the serial data input for storing the transferred data, and a serial data output coupled to the memory for transferring data out of the FIFO; and
   a storage device coupled to the serial data input and the serial data output for transferring serial data through the FIFO by bypassing the memory.

7. The cache serial FIFO of claim 6 wherein the storage device is also for transferring data out of the memory.

8. The cache serial FIFO of claim 7 wherein the storage device comprises:
   a write frame buffer coupled to the serial data input and coupled to the memory; and
   a read frame buffer coupled to the serial data input, the serial data output, the memory, and the write frame buffer, the read frame buffer additionally for receiving backfill data from the write frame buffer.

* * * * *